(12) United States Patent
Weis et al.

(10) Patent No.: US 8,855,300 B2
(45) Date of Patent: *Oct. 7, 2014

(54) IMAGE-BASED KEY EXCHANGE

(75) Inventors: Stephen A. Weis, San Francisco, CA (US); Travis E. McCoy, San Francisco, CA (US); Andrew D. Hintz, Sunnyvale, CA (US); Iain P. Wade, Ashfield (AU)

(73) Assignee: Google Inc., Mountain View, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 12/895,628

(22) Filed: Sep. 30, 2010

(65) Prior Publication Data

US 2012/0084571 A1  Apr. 5, 2012

(51) Int. Cl.
G06F 21/00 (2013.01)
G06F 21/34 (2013.01)
H04L 9/08 (2006.01)
G06F 21/36 (2013.01)

(52) U.S. Cl.
CPC .............. *G06F 21/34* (2013.01); *H04L 9/0861* (2013.01); *G06F 21/36* (2013.01)
USPC .................................. 380/44; 713/182; 726/5

(58) Field of Classification Search
CPC ..... G06F 21/36; G06F 21/34; H04L 63/0853; H04L 9/0827
USPC .................................. 380/44; 713/182; 726/5
See application file for complete search history.

(56) References Cited

U.S. PATENT DOCUMENTS

| 6,736,322 | B2 | 5/2004 | Gobburu et al. |
| 8,024,576 | B2 * | 9/2011 | Gargaro et al. ............... 713/183 |
| 2005/0059339 | A1 | 3/2005 | Honda et al. |
| 2006/0065733 | A1 * | 3/2006 | Lee et al. ................. 235/462.01 |
| 2007/0067828 | A1 * | 3/2007 | Bychkov ............................ 726/3 |
| 2007/0101403 | A1 * | 5/2007 | Kubler ............................... 726/3 |
| 2007/0123166 | A1 | 5/2007 | Sheynman et al. |
| 2007/0178882 | A1 | 8/2007 | Teunissen et al. |
| 2007/0203850 | A1 | 8/2007 | Singh et al. |
| 2008/0011825 | A1 | 1/2008 | Giordano et al. |
| 2008/0016358 | A1 * | 1/2008 | Filreis et al. ................... 713/176 |

(Continued)

FOREIGN PATENT DOCUMENTS

| EP | 2040228 A1 | 3/2009 |
| WO | WO-2009056897 A1 | 5/2009 |

OTHER PUBLICATIONS

Claycomb, William et al., "Using a Two Dimensional Colorized Barcode Solution for Authentication in Pervasive Computer" IEEE 2006, pp. 173-180.*

(Continued)

*Primary Examiner* — Michael Pyzocha
(74) *Attorney, Agent, or Firm* — Fox Rothschild LLP

(57) ABSTRACT

This disclosure is directed for improved techniques for configuring a device to generate a secondary password based at least in part on a secure authentication key. The techniques of this disclosure may, in some examples, provide for capturing, by a computing device, an image of a display of another computing device. The captured image includes at least one encoded graphical image, such as a barcode, that includes an indication of the content of a secure authentication key. The computing device may use the secure authentication key to generate a secondary password to be used in conjunction with a primary password to gain access to a password-protected web service.

20 Claims, 4 Drawing Sheets

(56) References Cited

U.S. PATENT DOCUMENTS

| | | | |
|---|---|---|---|
| 2008/0031445 A1* | 2/2008 | Lee et al. | 380/44 |
| 2008/0149518 A1* | 6/2008 | Macor | 206/459.5 |
| 2008/0149701 A1* | 6/2008 | Lane | 235/375 |
| 2009/0031405 A1* | 1/2009 | Tsutsumi et al. | 726/7 |
| 2009/0158032 A1* | 6/2009 | Costa et al. | 713/156 |
| 2009/0193264 A1* | 7/2009 | Fedronic et al. | 713/184 |
| 2009/0235339 A1* | 9/2009 | Mennes et al. | 726/5 |
| 2009/0288159 A1 | 11/2009 | Husemann et al. | |
| 2009/0294539 A1 | 12/2009 | Kim | |
| 2009/0328168 A1* | 12/2009 | Lee | 726/6 |
| 2010/0080383 A1* | 4/2010 | Vaughan et al. | 380/44 |
| 2010/0082966 A1* | 4/2010 | Lu et al. | 713/2 |
| 2010/0186074 A1 | 7/2010 | Stavrou et al. | |
| 2010/0191972 A1 | 7/2010 | Kiliccote | |
| 2010/0275010 A1* | 10/2010 | Ghirardi | 713/155 |
| 2011/0026716 A1* | 2/2011 | Tang et al. | 380/284 |
| 2011/0081860 A1* | 4/2011 | Brown et al. | 455/41.3 |
| 2011/0185174 A1* | 7/2011 | Blewett et al. | 713/168 |
| 2011/0210171 A1* | 9/2011 | Brown et al. | 235/382 |
| 2012/0266224 A1* | 10/2012 | Gruschka et al. | 726/7 |

OTHER PUBLICATIONS

Adida et al., "Scratch & Vote, Self-Contained Paper-Based Cryptographic Voting", CCS '06, Oct. 30-Nov. 3, 2006, Alexandria, Virginia, USA, 11 pp.

Wikipedia.org definition: "End-to-end auditable voting systems", accessed Jun. 21, 2010, 4 pp. http://en.wikipedia.org/wiki/End-to-end_auditable_voting_systems.

Office Action from U.S. Appl. No. 13/251,029, dated Dec. 1, 2011, 13 pp.

Response to Office Action dated Dec. 1, 2011, from U.S. Appl. No. 13/251,029, filed Mar. 1, 2012, 9 pp.

International Preliminary Report on Patentability and Written Opinion from international application No. PCT/US2011/053313, dated Apr. 11, 2013, 6 pp.

Response to Office Action dated Apr. 4, 2012, from U.S. Appl. No. 13/251,029, filed Jun. 4, 2012, 10 pp.

International Search Report and Written Opinion of international application No. PCT/US2011/053313, mailed Apr. 10, 2012, 9 pp.

Office Action from U.S. Appl. No. 13/251,029, dated Apr. 4, 2012, 13 pp.

HMAC-based One-time Password Algorithm, Wikipedia, the free encyclopedia, Sep. 11, 2010, pp. 1-2, retrieved from the Internet: http://en.wikipedia.org/wiki/HMAC-based_One-time_Password_Algorithm.

E. Hammer-Lahav, "The OAuth 1.0 Protocol", Apr. 30, 2010, pp. 1-38, retrieved from the Internet: http://tools.ietf.org/pdf/rfc5849.pdf.

* cited by examiner

IMAGE-BASED KEY EXCHANGE

TECHNICAL FIELD

In general, this disclosure is directed to techniques for improving a user experience in transferring data between devices.

BACKGROUND

For security purposes, many web-based services require a user to enter a username and password to gain access. Requiring a username and password for web-service access may provide some level of security for users and web-based service providers. Online criminals may potentially, in certain cases, be able to acquire a user's username and password. An online criminal may access a user's username and password from a location remote from a user by a variety of methods. Thus, it may be desirable for a web-based service provider to provide users with additional security measures to reduce a chance of identity theft for users.

SUMMARY

In general, this disclosure is directed to techniques for the exchange of an authentication key between devices. The various techniques described herein provide for an improved user experience when transferring a secure authentication key, as a user need not manually enter secure authentication key content. The techniques of this disclosure further provide for improved security for transfer of a secure authentication key between devices.

In one example, a method of configuring a computing device to provide a secondary authentication password for a password-protected web service is described herein. The method includes capturing, using an image capture device of a first computing device, an encoded graphical image presented by a display of a second computing device. The encoded graphical image indicates a representation of a secure authentication key. The method further includes determining, from the detected encoded graphical image, the secure authentication key. The method further includes storing the secure authentication key on the computing device for subsequent use to generate a password to acquire access to a password-protected web service.

In another example, a computing device is described herein. The computing device includes a processor and an image capture device. The computing device further includes a camera module configured to capture at least one image of a display of another computing device, wherein the at least one captured image includes at least one encoded graphical image. The computing device further includes means for processing the captured image to determine content of a secure authentication key represented by the encoded graphical image. The computing device further includes means for storing the secure authentication key on the computing device. The computing device further includes a storage module to store the secure authentication key on the computing device for subsequent use to generate a password to acquire access to a password-protected web service.

In another example, an article of manufacture comprising a computer-readable medium that stores instructions configured to cause a computing device to configure a mobile device to provide a secondary authentication password for a password-protected web service. The instructions cause the computing device to capture, via an image capture device communicatively coupled to a first computing device, an encoded graphical image presented via a display of a second computing device, wherein the encoded graphical image indicates a representation of a secure authentication key. The instructions further cause the first computing device to determine, from the detected encoded graphical image, the secure authentication key. The instructions further cause the first computing device to store the secure authentication key on the computing device. The instructions further cause the first computing device to use the stored secure authentication key to generate a secondary password to be used in conjunction with a primary password to acquire access to a password-protected web service.

In another example, a method for providing a secondary password authentication for a password-protected web service is described herein. The method includes receiving, from a user, a request for a secure authentication key. The method further includes generating an encoded graphical image that includes at least one indication of the secure authentication key. The method further includes transmitting for display by a display of a first computing device a graphical image that indicates a representation of a secure authentication key, wherein the secure authentication key is configured to be stored on a second computing device and subsequently used by the second computing device to generate a password to be used to gain access to a password-protected web service.

The details of various examples of the techniques of this disclosure are set forth in the accompanying drawings and the description below. Other features, objects, and advantages of the techniques of this disclosure will be apparent from the description and drawings, and from the claims.

DETAILED DESCRIPTION

Figure 1:
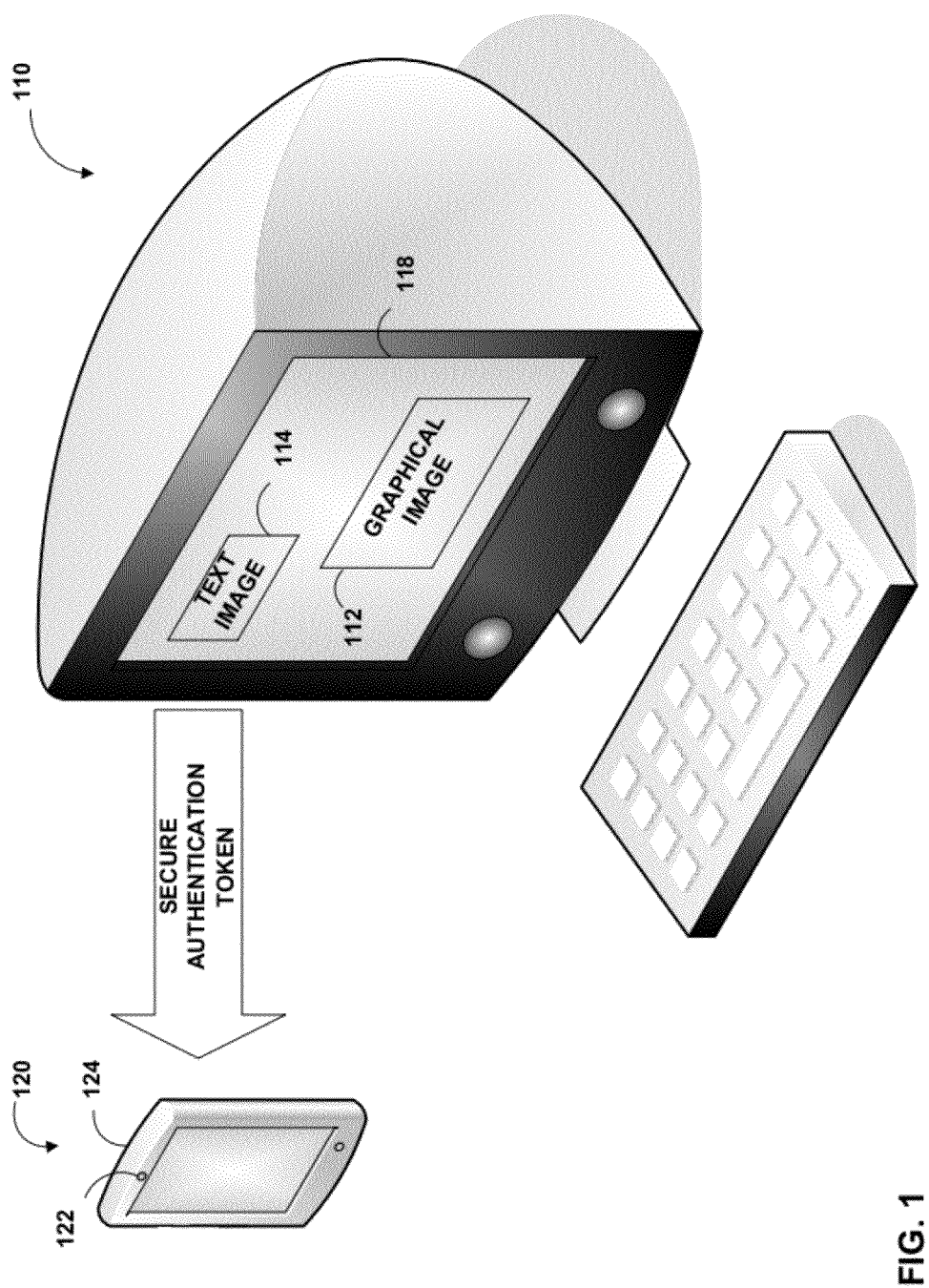
FIG. 1 is a conceptual diagram illustrating one example of a computing system for configuring a device as a password device consistent with the techniques of this disclosure.

FIG. 1 is a conceptual diagram that illustrates one example of a computing system configured to enable secondary password authentication of a password-protected web service consistent with the techniques of this disclosure. As shown in FIG. 1, the system includes a setup device 110 and a password device 120. In the example illustration of FIG. 1, setup device 110 is a desktop computer, and password device 120 is a mobile phone. In other examples, setup device 110 and password device 120 may be any combination of computing devices. For example, setup device 110 may be a laptop computer, a netbook or smartbook computer, a tablet computing device, a television, or any other form of computing device. Similarly, password device 120 may be a mobile device such as a mobile phone, tablet computer, or the like, however password device 120 may instead be desktop computer, laptop, smartphone, or netbook.

Although not shown in FIG. 1, setup device 110 may be configured to operate a web browser or other mechanism for accessing web services such as web pages offering services via a network (e.g., via the Internet). For many web services, for example banking services, shopping services, or the like, it may be desirable to provide security to a user to protect the user's information. For this purpose, many web service providers offer a user with a unique username/password identification to gain access to some or all services offered by the web service provider.

Unfortunately, although using a username/password combination to securely authenticate a user's identity before being granted access to a web service may provide some level of security, it may be possible, in some instances, for an online criminal to acquire a user's login information using to various techniques. Often, an identity theft criminal may acquire a user's login information from a location remote from a user. Thus, it may be desirable to provide additional mechanisms to verify a user's identity for access to a password-protected web service.

Some secure web-based services provide users with an ability to set up a secondary password that is more secure than a simple username/password combination for security. The secondary password may be tied to a password device 120. In one such example, a secure authentication key is stored on the password device 120. The secure authentication key may be a series of alphanumeric or other characters provided to the user by the web service to be protected and/or a different web service providing secondary password services. The secure authentication key may be used by the password device 120 to generate a unique "one time" secondary password each time the user desires to access a web service. Such a password may be "one time" in the sense that a new password is generated each time the user attempts to gain access to a web service.

Various examples described herein are directed to the use of a graphical image to communicate a secure authentication key between devices for purposes of generating a secondary password to gain access to a password-protected web service. The described use of the techniques of this disclosure to generate a secondary password is provided for exemplary purposes only. One of ordinary skill in the art will recognize that the techniques of this disclosure may also be applicable to intra-device communication of any type of authentication key.

A secondary password as described herein may be generated based on a particular algorithm. Various examples of password generation algorithms and/or techniques are contemplated and consistent with the techniques of this disclosure. Some non-limiting example of an algorithm that may be used to generate a secondary password are Hash-based Message Authentication Code (HMAC)-based One Time Password (HOTP) and Time-based One-time Password (TOTP) algorithms. An HOTP algorithm may be used to generate a unique secondary password each time a password is generated by accessing a count value of a number of passwords generated. For example, for a 6th secondary password may be different than a 7th secondary password. A TOTP algorithm may be used to generate a unique secondary password based on a time of day. According to TOTP, a secondary password may be generated differently based on a predefined time increment. For example, where the predefined time increment is 10 minutes, a secondary password generated at 12:01 pm would be different than a secondary password generated at 12:11 pm.

A web service may be configured to deny entry unless a user enters the secondary password generated by the password device. For HOTP, the web service may be configured to deny access if a secondary password is not entered within a predefined period of time. For example, a secondary password as described herein may include an indication of a time stamp, and the web service may only recognize the secondary password as valid if entered during that predefined time period. For TOTP, a secondary password may only remain valid for the predetermined time period used to generate the secondary password as described above.

By requiring a secondary password generated by a password device 120, a greater level of security may be provided for web services, because a potential online criminal must not only access a user's username and password, the criminal must also have access to the password device 120 to acquire a secondary password to gain access to a web service. In some cases, it may be desirable for a user's password device 120 to be a mobile phone, tablet computer, or some other portable device that the user will likely have access to when the user desires to gain access to a password-protected web service, regardless of the user's location.

To configure a device as a password device 120 as described above, a secure authentication key may be stored on the password device 120. To transfer the authentication key to the password device 120, a user may be presented, via a display 118 of setup device 110, one or more text images 114 representing the text of the secure authentication key. Accordingly, a user may read the text of the text image 114 and correspondingly enter, via one or more input mechanisms of the password device 120, the secure authentication key. As described above, the secure authentication key may be a long and/or complex series of alphanumeric or other characters.

To save space and configure a device to a desired form factor, many devices (e.g., mobile phones, tablet computers) incorporate limited mechanisms for receiving user input in comparison to more classical devices such as desktop or laptop computers. For example, many devices incorporate a limited physical keyboard. As another example, many touch screen devices have no physical keyboard at all, and instead rely on a graphical keyboard presented at a display of the device to receive user input. Limited input mechanisms for some devices may make entry of a long and/or complex series of characters, such as for a secure authentication key, cumbersome, time-consuming, and/or difficult for a user.

In one example, as shown in FIG. 1, according to the techniques of this disclosure a user may be presented, via display 118 of setup device 110, an encoded graphical image 112 that represents the content of a secure authentication key. Password device 120 may detect the encoded graphical image 112, process the detected image to determine the content of the secure authentication key, and store the determined secure authentication key in one or more memory devices of password device 120. In one example, to detect the encoded graphical image 112, a password device 120 may include, or be communicatively coupled to, one or more camera elements 122, 124, or other image sensor(s) configured to capture an image of the display 118 including the encoded graphical image 112. As shown in the example of FIG. 1, a password device 120 may include one or more of a front-facing camera element 122, or a back-facing camera element 124. Either or both of front facing 122 and back facing camera 124 camera elements may be utilized to capture an image including encoded graphical image 112.

In one example, encoded graphical image 112 may be a bar code, hologram, video, or other image that may be used to communicate information in an encoded form. In some examples, the encoded graphical image 112 may be provided in conjunction with one or more other forms of communications, e.g., audio signals communicated by setup device 110 and detectable by password device 120. Password device 120 may further include any combination of software or circuitry that decodes and/or otherwise processes a captured encoded graphical image 120 to determine a secure authentication key. Password device 120 may further store a decoded secure authentication key in a memory (e.g., a volatile or non-volatile memory) for later use generating a secondary password as described in further detail below.

In some examples, an encoded graphical image 112 as described herein may include various information in addition to the content of a secure authentication key. For example, an encoded graphical image 112 may include information indicating various parameters for password device 120 to use when generating a secondary password as described in further detail with respect to the example of FIG. 2. Communication of such additional information via an encoded graphical image may improve a level of security for secondary password-based user identity authentication.

In some examples, a secure authentication key may be encoded in a particular format recognizable by password device 120 and/or software applications executing on a processor of password device 120. In one example, the content of a secure authentication key may be communicated via graphical image 112 in the form of a uniform resource locator (URL). According to this example, a particular password device 120 may be configured to recognize a prefix of the URL (e.g., "prefix//[SecureAuthenticationKey][AddionalInformation]), and upon recognizing that prefix, cause one or more software applications to initiate and or execute operations on password device 120. For example, the prefix may indicate that a software application should decode a captured graphical image 112, determine a secure authentication key from graphical image 112, and store the secure authentication key in a memory of password device 120.

In other examples consistent with the techniques of this disclosure, an encoded graphical image 112 may not include a direct indication of a secure authentication key (e.g., the content of a secure authentication key). Instead, an encoded graphical image 112 may include an indication of a network location where a secure authentication key may be accessed. According to this example, an encoded graphical image 112 may include an indication of a URL where a secure authentication key is stored, such that password device 120 may access the secure authentication key from one or more servers communicatively coupled to password device 120 via a network.

In some examples consistent with the techniques of this disclosure, an encoded graphical image 112 as described herein may provide for an improved user experience in configuring a device as a password device 120 operative to generate a secondary password. In one example, a user experience may be improved, because a user need not manually enter, via typing, the content of a secure authentication key, which may be cumbersome, complex, and/or time consuming on some devices. In addition, according to examples where the text image 114 is not displayed on setup device 110, a risk that someone else may viewing text image 114 to determine a user's secure authentication key may be reduced. Even further, a user may configure password device 120 without needing password device 120 to be coupled to a network such as a cellular network or Wi-Fi network. Instead, the secure authentication key is communicated to password device 120 optically.

Figure 2:
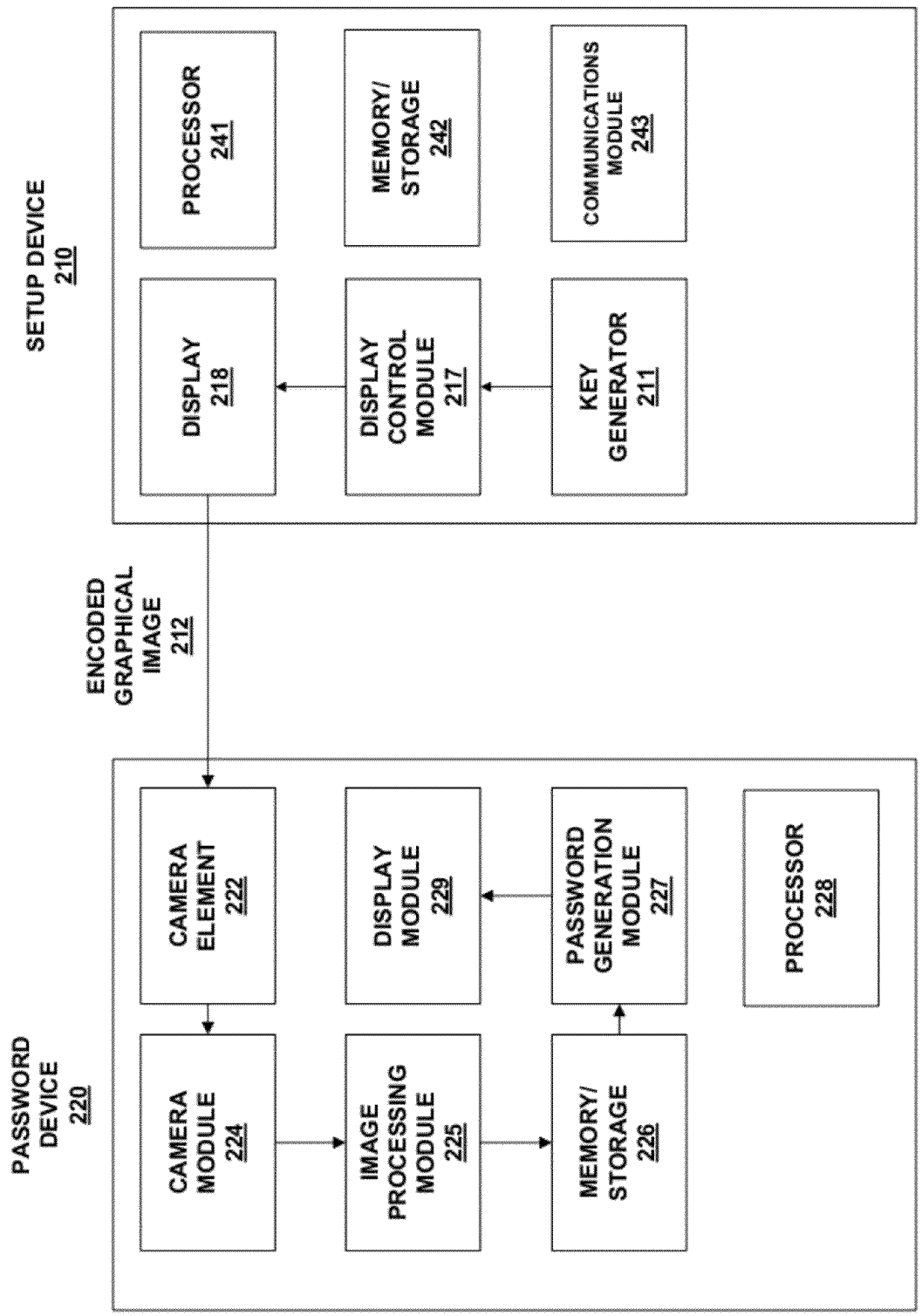
FIG. 2 is a block diagram illustrating one example of a password device and a setup device consistent with the techniques of this disclosure.

FIG. 2 is a block diagram illustrating generally one example of a setup device 210 adapted to configure a device as a password device 220 consistent with the techniques of this disclosure. As shown in FIG. 2 setup device 210 includes a key generator 211, a display control module 217, and a display 218, a processor 241, memory/storage 242, and communications module 243. Processor 241 may be configured to execute program instructions, e.g., one or more software applications, to run on setup device 210. Program instructions of software applications may be stored in memory/storage 242 (e.g., temporary memory (random access memory), or long-term storage (e.g., magnetic hard disk, Flash memory)), along with other types of information. Communications module 243 may establish a communications link with other computing devices via one or more networks. For example, communications module 243 may include hardware and/or software to enable wired (e.g., dial-up, Ethernet, optical) or wireless (cellular network, Wi-Fi®) communications over a network such as the Internet.

Processor 241 may execute program instructions to cause a browser application that displays information available via communications module 243. For example, processor 241 may execute program instructions to cause a password-protected web service (e.g., a banking, shopping, or other secure web service) to be displayed to a user.

Key generator 211 may be any combination of hardware and/or software configured to generate a series of alphanumeric or other characters as a secure authentication key as described herein. For example, key generate 211 may be software executable on processor 241 of setup device 210. Although FIG. 1 depicts key generator 211 as a part of setup device 210, key generator 211 may instead be external from setup device 210. For example, key generator 211 may include any combination of software/hardware of another computing device, e.g., another computing device accessible over a network via communications module 243. For example, key generator 211 may include any combination of hardware and/or software of one or more network servers or other computing devices of a password-protected web service as described herein. In other examples, key generator 211 may include any combination of hardware and/or software of one or more network servers of other web services, for example a provider of secondary password authentication services other than a password-protected web service itself.

As also shown in FIG. 2, setup device includes a display 218 and a display control module 217. Display control module 217 may be operable to control images presented via display 218. For example, display control module 217 may be configured to receive, from key generator 211, at least one indication of content of a secure authentication key as described herein, and correspondingly present an encoded graphical image 212 (e.g., encoded graphical image 112 as shown in FIG. 1), via display 218. The encoded graphical image 212 may be a barcode, hologram, video, or other graphical image encoded to include the content (e.g., a string of alphanumeric or other characters) of a secure authentication key. Examples of different types of graphical images that may be used to encode a secure authentication key as an image include a UPC-A bar code, an EAN-13 bar code, a Code 93 bar code, a code 128 bar code, a PDF417 image, Semacode, a DataMatrix 2D image, Aztec Code, EZcode, High Capacity Color barcode, Dataglyphs, a QR Code, a MaxiCode, and a ShotCode. Other examples of graphical images that may be configured to encode information, e.g., a secure authentication key, are also contemplated and consistent with this disclosure. For example, an encoded graphical image 112 may include a video comprising a series of graphical images to encode a secure authentication key. In some examples, the encoded graphical image 112, e.g., a video or still image, may be provided in conjunction with one or more other forms of communications, e.g., audio signals communicated by setup device 110 and detectable by password device 120.

The encoded graphical image 212 may further include information in addition to the content of a secure authentication key. For example, encoded graphical image 212 may include an identification of a user's account, which may be used to generate a secondary password to better improve security according to a secondary password technique as described herein. For example, password generation module 227 (described in further detail below) may require that a user enter a primary password associated with a user's account to initiate generation of a secondary password as described herein.

Encoded graphical image 212 may further include an indication of a type of protocol to be used to generate a secondary password from a secure authentication key. As described above, examples of types of algorithms that may be used to generate a secondary password as described herein include HOTP and TOTP. According to one example, a graphical image 212 may include an indication of whether TOTP, HOTP, or some other algorithm is to be used to generate a secondary password by password device 220.

The TOTP and HOTP algorithms for generation of a secondary password may utilize a Hash-based Message Authentication Code (HMAC) to generate a secondary password as described herein. HMAC may support a number of different hash definition mechanisms. Such a hash definition mechanism may be referred to as a message authentication code. According to one example, where a TOTP or HOTP algorithm is to be used to generate a secondary password as described herein (e.g., according to an indication of an algorithm type as described above), a graphical image 212 may further include an indication of a specific mechanism for defining one or more hashes to be used to generate a secondary password. Examples of hash mechanisms that may be used include SHA1, SHA256, SHA512, and MD5. Other hash mechanisms for use with a TOTP or HOTP algorithm are also contemplated and consistent with this disclosure.

In another example, graphical image 212 may include an indication of a length of a secondary password to be provided to a user to gain access to a web-service as described herein. For example, the indication of a length may indicate that a series of six letters or numbers should be provided to a user to gain secure access.

According to some examples of secondary password generation algorithms (e.g., an HOTP algorithm as described above), a secondary password is generated based on a counter value. According to examples where a mobile device software application is configured to utilize a counter-based algorithm (e.g., via an indication of an algorithm type as described above), graphical image 212 may include an indication of a counter initialization value.

In another example, a secondary password may operate such that the secondary password only remains valid for a predetermined amount of time. Accordingly, graphical image 212 may further include an indication of an amount of time for which a generated secondary password remains valid to gain access to a web service. In one specific example, graphical image 212 may include an indication that a secondary password is to remain valid for thirty seconds, and after thirty seconds a new secondary password must be generated to gain access to the web service. A corresponding secondary password may be generated such that it includes an indication of a time period (e.g., a time of day) for which the password is to remain valid.

As also shown in FIG. 2, password device 220 includes at least one camera element 222 and a camera module 224. As described herein, the terms camera element and image capture device may used interchangeably. Camera module 224 may be operable to control at least one camera element 222 of password device 120 (or communicatively coupled to password device 120) to capture images. According to the techniques of this disclosure, camera module 224 may control at least one camera element 222 to capture an image of display 218 of setup device 210 that includes at least one encoded graphical image 212 as described herein.

An image processing module 225 may be coupled to camera module 224. Image processing module 225 may receive a captured image of display 218 that includes graphical image 212, and decode and/or otherwise process graphical image 212 to determine the content of a secure authentication key. For this purpose, image processing module 225 may include any combination of hardware (e.g., digital signal processing circuitry (not shown), processor 241) and/or software configured to process contents of graphical image 212 and determine content of graphical image 212, for example content of a secure authentication key and/or other information of graphical image 212. In some examples, image processing module 225 may distinguish between the content of the secure authentication key and other information of encoded graphical image 212.

Image processing module 225 may further store information acquired from encoded graphical image 212 on password device 220. For example, image processing module 225 may be coupled to one or more memory/storage elements (e.g., long term storage, temporary memory) 226 of password device 220. Image processing module 225 control the one or more storage elements 226 to temporarily or permanently store a secure authentication key, and/or other information acquired from encoded graphical image 212, for later use in generating a secondary password as described in further detail below with respect to FIG. 3. According to the example illustrated in FIG. 2, password device 220 further includes a password generation module 227, and display control module 229. Password generation module 227 and display control module 229 may be operable to generate a secondary password for presentation to a user of password device 220 via a display (not shown) of password device 220 as described in further detail with respect to FIG. 3.

Figure 3:
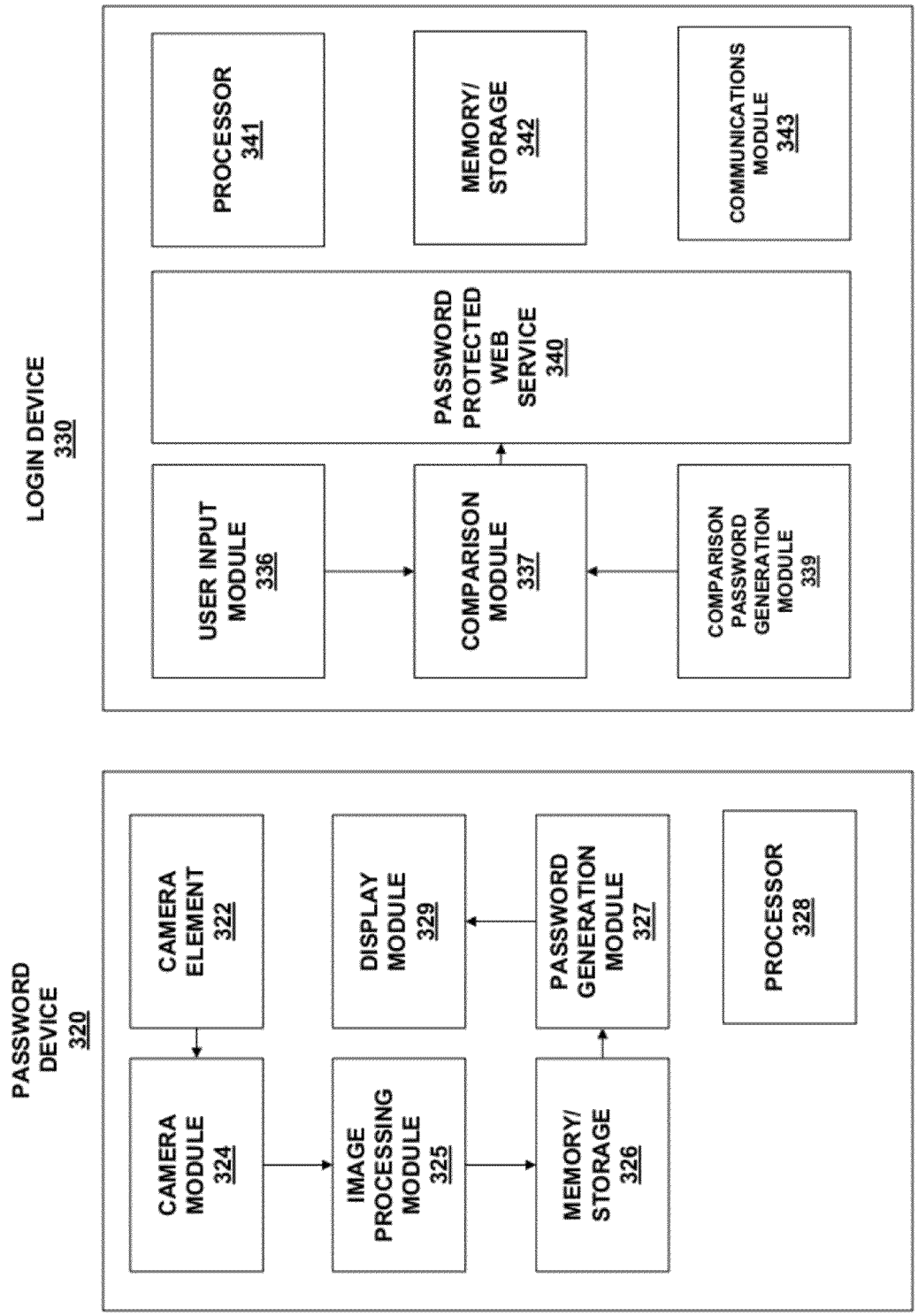
FIG. 3 is a block diagram illustrating one example of a password device and a login device consistent with the techniques of this disclosure.

FIG. 3 is a block diagram that illustrates generally one example of a using a secondary password generated by a password device 320 to gain access to a password-protected web service 340 via a login device 330 consistent with the techniques of this disclosure. According to the example of FIG. 3, login device 330 may present, via a display of the login device 330, a graphical depiction of a login screen for a password-protected web service 340. For example, a browser software application may be executed on a processor 341 of login device 330. The browser may display web accessible content, for example a web page that presents a login screen for password-protected web service 340. The login screen may, in one example, present a user with an option to enter the user's username and primary password (e.g., according to a classical username/password login as described above). The login screen may further provide a user with an option to enter a secondary password according to the techniques of this disclosure.

Login device 330 as depicted in FIG. 3 may be any type of computing device with access to a password-protected web service 340 via a network such as the Internet. For example, login device 330 may be a desktop or laptop computer, a mobile phone, tablet computer, smartbook, or netbook. In one example, login device 330 may be the same device as setup device 320 depicted in FIG. 2. In other examples, login device 330 may be a different device than setup device 220, and may furthermore be at a different location than setup device 220.

One benefit of providing additional security according to the techniques of this disclosure is that the use of a secondary password for authentication purposes is not limited to a specific device a user uses to gain access to password-protected web service 340. Instead, a user may utilize the techniques of this disclosure to gain access to password-protected web service 340 using any device capable of accessing password-protected web service 340.

According to the example show in FIG. 3, a secure authentication key has been stored on password device 320, e.g. in memory/storage 326, as described above with respect to FIG. 2. According to the techniques of this disclosure, a secure authentication key acquired by password device 320 detection of an encoded graphical image 112 may be used to generate a secondary password for use in acquiring access to the password-protected web service 340, for which a login screen is presented via login device 330. As depicted in FIG. 3, password device 320 includes a password generation module 327 and a display module 328. Password generation module 327 may, at least based on the content of secure authentication key stored in storage element 236, generate a secondary password. In some examples, password generation module 327 may be configured to generate a one-time use secondary password.

For example, password generation module 327 may generate a secondary password based on a time of day, an internal clock, counter or other indication for generating a unique password for one-time use to attempt to gain access to password-protected web service 340. In one specific example, according to an HOTP algorithm, a secondary password may be generated based on a counter value stored on password device 320. Password generation module 327 may generate a different secondary password when the counter value changes. The counter value may be updated each time a secondary password is generated by password generation module 327. In another specific example, e.g., according to a TOTP algorithm, password generation module 327 may generate a secondary password during a first time period (e.g., between 12:00 am and 12:10 am, and generate a different secondary password different than the first secondary password between 12:10 am and 12:20 am.

As shown in FIG. 3, password device 320 further includes display module 329. Display module 328 may operate a display (not shown) of password device 320 to cause images to be presented via the display. For example, display module 329 may receive at least one indication of a secondary password generated by password generation module 327 and cause an image representing the content of the secondary password (e.g., an image including one or more characters of the secondary password) to a user. In one example, display module 329 may include any combination of password device 320 hardware and/or software executed on processor 328 configured to render images for presentation via a display of password device 320.

As also shown in FIG. 3, login device 330 includes a user input module 336. User input module 336 is configured to detect user input indicating a secondary password generated by password device 320. For example, user input module 336 may be communicatively coupled to a keyboard, mouse, trackpad, touch-sensitive device, (e.g., screen, or other touch sensitive component), microphone, accelerometer, gyroscope, force sensor (e.g., force of touch on device surface, or any other mechanism for the detection of user input. User input module 336 may be configured to receive a secondary password from a user via one or more input mechanism as described above.

Login device 330 further includes comparison password generation module 339. Comparison password generation module 339 may have access, for example via network communication (not shown in FIG. 3), or via access to one or more storage elements 342 of login device 330 to a user's secure authentication key (e.g., the secure authentication key stored on password device 320). Comparison password generation module 339 may generate, based on the same or similar algorithm as password generation module 327, a password for comparison. As described above, password generation module 327 may generate a unique one-time secondary password. In one example, for a secondary password generated according to an HOTP algorithm, comparison password generation module 339 may generate a secondary password based on a counter value (e.g., stored on login device or accessible via a network) associated with a user's account, and generate a corresponding secondary password for comparison. In another example, for a secondary password generated according to a TOTP algorithm, comparison password generation module 339 may generate a secondary password based on a time of day.

In one example, comparison password generation module 339 may include any combination of software executing on a processor 241, or other hardware, of login device 310. In other examples, comparison password generation module 339 may include software and/or hardware of a device other than login device 310, such as one or more other computing devices accessible to login device via a network. For example, comparison password generation module 339 may include hardware and/or software of one or more network services of the password-protected web service, or another web service provider.

Comparison module 337 may receive a secondary password via user input module 336, and a comparison password from comparison password generation module 339. Comparison module 337 may determine whether the secondary password received from user input module 336 and the comparison password from comparison password generation module 337 and determine if they are identical. For example, comparison module 337 may determine whether the secondary and comparison passwords contain identical alphanumeric or other characters. If the passwords are identical, and a user's username and primary password also match, a user may be granted access to the password-protected web service.

In one example, according to an HOTP algorithm as described above, comparison module 337 may also or instead determine whether a secondary password received via user input module 336 is still valid. For example, a secondary password may include an indication of a time period for which the secondary password is still valid, or of a time of day at which the validity of the secondary password expires. Accordingly, comparison module 337 may deny access to password-protected web service 340 even if the secondary password and comparison password match.

In another example, according to a TOTP algorithm as described above, both the secondary password and the comparison password are generated based on an indication of a time of day. So long as the passwords are both generated within a predetermined time period, they will match. However, if a user waits longer than a predetermined time period after generation by password device 320 of a secondary password to enter that secondary password via login device 330, the secondary password will not match the comparison password, and a user will not be granted access to password-protected web service 340.

Generation of a secondary password according to the techniques of this disclosure may be advantageous, because this technique ensures that someone attempting to access the password-protected web service maintains access to password device. One may not simply gain access to password device 320 once, generate a password, and continually use that password to access password-protected web service 340.

Figure 4:
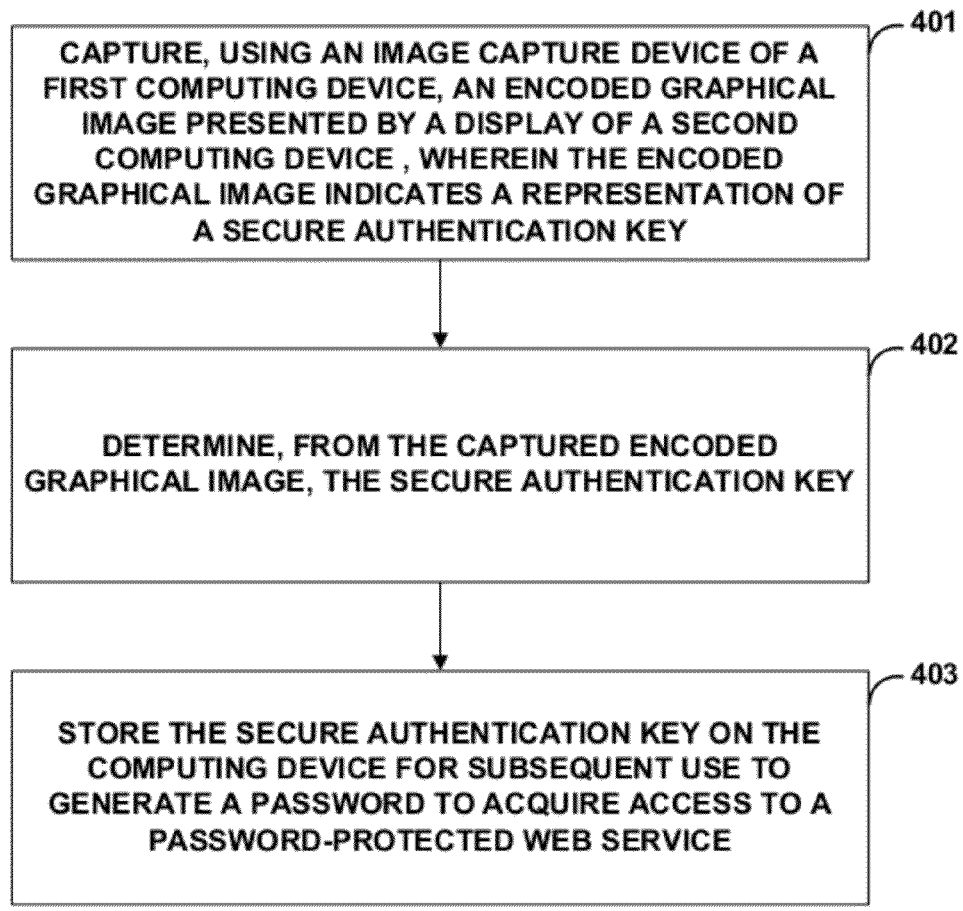
FIG. 4 is a flow chart diagram illustrating one example of a method of exchanging a secure authentication key consistent with this disclosure.

FIG. 4 illustrates generally one example of a method of configuring a computing device (e.g., password device 120, 220) to provide a password for a password-protected web service. The method includes capturing, using an image capture device (e.g., front-facing camera element 122, back-facing camera element 124) of a first computing device (e.g., password device 120, password device 220), an encoded graphical image 212 presented by a display (e.g., display 118) of a second computing device (e.g., setup device 110, setup device 210), wherein the encoded graphical image (e.g., graphical image 112, graphical image 212) indicates a representation of a secure authentication key (401). The method further includes determining, from the captured encoded graphical image, the secure authentication key (402). The method further includes storing the secure authentication key on the computing device (e.g., password device 120, password device 220) for subsequent use to generate a password to acquire access to a password-protected web service (403). In one example, the method further includes using the stored secure authentication key to generate a password to acquire access to the password-protected web service (e.g., password-protected web service 340). In another example, using the stored secure authentication key to generate a password includes using the stored authentication key to generate a secondary password to be used in conjunction with a primary password to acquire access to the password-protected web service.

In one example, the encoded graphical image 112, 212 includes a bar code, hologram, and/or video. The encoded graphical image 112, 212 may further be presented in conjunction with other, non-graphical signals, e.g., audio signals detectable by password device (e.g., password device 120, e.g., password device 220). The encoded graphical image 112, 212 further includes at least one indication of an identification of a user. The encoded graphical image 112, 212 may further include at least one indication of a URL. The encoded graphical image 112, 212 may further include at least one indication of a length of the generated secondary password. The encoded graphical image 112, 212 may further include at least one indication of a type of algorithm to be used to generate the secondary password. The encoded graphical image 112, 212 may further include one or more indications of a hash type to be used according to the algorithm. In one example, the type of algorithm may a Hash-based Message Authentication Code (HMAC)-based One Time Password (HOTP). In another example, the type of algorithm may be a Time-based One-time Password (TOTP). In one example wherein the type of algorithm is HOTP, the encoded graphical image 112, 212 may include one or more indications of a time for which a generated secondary password is to remain valid to grant a user access to the password-protected web service.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the disclosure have been described. These and other embodiments are within the scope of the following claims.

The invention claimed is:

1. A method comprising:
    capturing via a camera in a first computing device an encoded image presented by a second computing device, wherein the encoded image comprises a secure authentication key and at least one graphically encoded indication of how to use the secure authentication key to generate a password;
    determining, using the captured encoded image, the secure authentication key and the at least one graphically encoded indication of how to use the secure authentication key to generate the password; and
    generating the password using the secure authentication key and the at least one graphically encoded indication of how to use the secure authentication key to generate the password to acquire access to a password-protected web service.

2. The method of claim 1, wherein using the secure authentication key to generate a password comprises using the stored secure authentication key to generate a secondary password to be used in conjunction with a primary password to acquire access to the password-protected web service.

3. The method of claim 1, wherein the encoded image comprises a bar code or a hologram.

4. The method of claim 1, wherein the encoded image further includes at least one indication of an identification of a user.

5. The method of claim 1, wherein the encoded image includes at least one indication of a uniform resource locator (URL).

6. The method of claim 5, wherein the at least one indication of the URL comprises:

a prefix field that indicates an operation to be performed by the first computing device;
a representation of a secure authentication key; and
additional information that indicates an intended use of the secure authentication key.

7. The method of claim 5, wherein the URL indicates a location where a secure authentication key can be accessed.

8. The method of claim 1, wherein the at least one graphically encoded indication of how to use the secure authentication key to generate a password further includes at least one indication of a length of a password generated based on the secure authentication key.

9. The method of claim 1, wherein the at least one graphically encoded indication of how to use the secure authentication key to generate a password further includes at least one indication of a type of algorithm to be used to generate a password based on the secure authentication key information.

10. The method of claim 9, wherein the at least one graphically encoded indication of how to use the secure authentication key to generate a password further includes one or more indications of a type of hash to be used according to the algorithm.

11. The method of claim 9, wherein the type of algorithm is selected from the group consisting of:
a Hash-based Message Authentication Code (HMAC)-based One Time Password (HOTP); and
a Time-based One-time Password (TOTP).

12. The method of claim 11, wherein the type of algorithm is HOTP, and wherein the at least one graphically encoded indication of how to use the secure authentication key for generating a password further comprises:
one or more indications of a time for which a password generated based on the secure authentication key is to remain valid to grant a user access to a password-protected web service.

13. A computing device, comprising:
at least one processor;
a camera configured to capture an image provided by another computing device, wherein the captured image comprises an encoded image;
a processor operable to process the captured encoded image to determine, from the encoded image, a secure authentication key and at least one indication of how to use the secure authentication key to generate a password;
and generate the password to acquire access to a password-protected web service using the secure authentication key and the at least one indication of how to use the secure authentication key to generate the password, determined from the image presented by the another computing device.

14. The computing device of claim 13, the processor further operable to generate
a secondary password for use in conjunction with a primary password to gain access to a password-protected web service.

15. An article of manufacture comprising a computer-readable storage device that stores instructions operable when executed to configure a mobile device to provide an authentication password for a password-protected web service, wherein the instructions cause the mobile device to:
capture, using a camera an encoded image presented by a display of a second computing device, wherein the encoded image comprises a secure authentication key at least one indication of how to use the secure authentication key to generate the authentication password;
determine using the captured encoded image, the secure authentication key and the at least one indication of how to use the secure authentication key to generate the authentication password; and
generate the authentication password to acquire access to a password-protected web service using the secure authentication key and the at least one indication of how to use the secure authentication key to generate the authentication password, determined from the encoded image.

16. A method for providing a secondary password authentication for a password-protected web service, the method comprising:
receiving, from a user, a request for a secure authentication key;
generating an encoded graphical image that includes at least one indication of the secure authentication key and at least one indication of how to use the secure authentication key to generate the secondary password; and
transmitting, for display by a first computing device, the generated encoded graphical image, wherein the secure authentication key and the at least one indication of how to use the secure authentication key are configured to be received in a second computing device via an optical sensor and used to generate the secondary password to be used to gain access to the password-protected web service.

17. The method of claim 16, wherein the secure authentication key is configured to be used by the second computing device to generate the secondary password to be used in conjunction with a primary password to gain access to the password-protected web service.

18. The method of claim 16, wherein the request for the secure authentication key is received by the password-protected web service.

19. The method of claim 16, wherein the request for the secure authentication key is received by a web service different than the password-protected web service.

20. The method of claim 16, further comprising:
receiving, by the password-protected web service, the secondary password generated at the second computing device, wherein the secondary password is generated based at least in part on the secure authentication key; and
granting access to the password-protected web service based at least in part on authentication of the secondary password.

* * * * *